United States Patent
Wu et al.

(10) Patent No.: US 12,100,898 B2
(45) Date of Patent: Sep. 24, 2024

(54) ANTENNA MODULE AND ELECTRONIC DEVICE

(71) Applicant: PEGATRON CORPORATION, Taipei (TW)

(72) Inventors: Chien-Yi Wu, Taipei (TW); Wu-Hua Chen, Taipei (TW); I-Shu Lee, Taipei (TW); Hung-Ming Yu, Taipei (TW); Chao-Hsu Wu, Taipei (TW); Yung-Yi Lee, Taipei (TW); Man-Jung Tsao, Taipei (TW); Chi-Min Tang, Taipei (TW); Shao-Chi Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 133 days.

(21) Appl. No.: 17/940,917

(22) Filed: Sep. 8, 2022

(65) Prior Publication Data

US 2023/0155301 A1    May 18, 2023

(30) Foreign Application Priority Data

Nov. 16, 2021    (TW) .................................. 110142548

(51) Int. Cl.

| | | |
|---|---|---|
| *H01Q 21/12* | (2006.01) |
| *G01K 1/024* | (2021.01) |
| *H01Q 1/22* | (2006.01) |
| *H01Q 1/27* | (2006.01) |
| *H01Q 9/04* | (2006.01) |
| *H01Q 21/00* | (2006.01) |

(52) U.S. Cl.
CPC ............. *H01Q 21/12* (2013.01); *G01K 1/024* (2013.01); *H01Q 1/2291* (2013.01); *H01Q 1/273* (2013.01); *H01Q 9/045* (2013.01); *H01Q 21/0006* (2013.01)

(58) Field of Classification Search
CPC ...................... H01Q 21/12; H01Q 9/045–0457
See application file for complete search history.

(56) References Cited

U.S. PATENT DOCUMENTS

| | | | | |
|---|---|---|---|---|
| 6,147,658 A | * | 11/2000 | Higashi | H01Q 3/12 333/167 |
| 6,922,116 B1 | * | 7/2005 | Gordon | H01Q 9/28 333/100 |
| 10,804,609 B1 | * | 10/2020 | Nosrati | H01Q 3/26 |
| 11,018,441 B2 | | 5/2021 | Wada | |

(Continued)

FOREIGN PATENT DOCUMENTS

| | | | |
|---|---|---|---|
| CN | 103700931 | | 4/2014 |
| CN | 103700931 A | * | 4/2014 |

(Continued)

*Primary Examiner* — Ab Salam Alkassim, Jr.
(74) *Attorney, Agent, or Firm* — J.C. PATENTS

(57) ABSTRACT

An antenna module includes a feeding end, multiple first forked radiators, and multiple connecting parts. The first forked radiators are disposed side by side. The connecting parts respectively extend from the feeding end to the first forked radiators. The feeding end, the first forked radiators, and the connecting parts are located on a same plane. The antenna module resonates at a frequency band, and a path length from the feeding end to an end of each of the forked radiators through the corresponding connecting part is ¼ wavelength of the frequency band.

17 Claims, 7 Drawing Sheets

(56) References Cited

U.S. PATENT DOCUMENTS

| | | | | |
|---|---|---|---|---|
| 11,626,668 B2* | 4/2023 | Li | ............... | H01Q 21/0043 |
| | | | | 343/771 |
| 2005/0156787 A1* | 7/2005 | Myoung | ............... | H01Q 9/40 |
| | | | | 343/700 MS |
| 2005/0237244 A1* | 10/2005 | Annabi | ............... | H01Q 1/48 |
| | | | | 343/702 |
| 2009/0002248 A1* | 1/2009 | Zhao | ............... | H01Q 13/10 |
| | | | | 343/722 |
| 2009/0256777 A1* | 10/2009 | Nagai | ............... | H01Q 9/0407 |
| | | | | 343/893 |
| 2014/0266939 A1* | 9/2014 | Baringer | ............... | H01Q 1/22 |
| | | | | 343/729 |
| 2016/0006123 A1* | 1/2016 | Li | ............... | G06K 19/025 |
| | | | | 343/867 |
| 2016/0028153 A1* | 1/2016 | Li | ............... | H05K 1/142 |
| | | | | 343/718 |
| 2017/0141472 A1* | 5/2017 | Park | ............... | H01Q 9/0414 |
| 2018/0026377 A1* | 1/2018 | Trotta | ............... | H01Q 1/2283 |
| | | | | 343/872 |
| 2018/0041241 A1* | 2/2018 | Trotta | ............... | H04B 1/385 |
| 2018/0241135 A1* | 8/2018 | Furlan | ............... | H01Q 21/0075 |
| 2018/0287243 A1* | 10/2018 | Ko | ............... | H01Q 1/273 |
| 2018/0351250 A1* | 12/2018 | Achour | ............... | H01Q 21/064 |
| 2019/0067803 A1* | 2/2019 | Kang | ............... | H01Q 5/364 |
| 2019/0380306 A1* | 12/2019 | Niikura | ............... | H02S 20/30 |
| 2019/0386711 A1* | 12/2019 | He | ............... | H01Q 1/273 |
| 2022/0200160 A1* | 6/2022 | Li | ............... | H01Q 21/0043 |
| 2023/0031609 A1* | 2/2023 | Russo | ............... | H01P 5/1007 |

FOREIGN PATENT DOCUMENTS

| | | | | | |
|---|---|---|---|---|---|
| CN | 204809391 U | * | 11/2015 | | |
| CN | 106299665 A | * | 1/2017 | ............... | H01Q 1/38 |
| CN | 210224293 | | 3/2020 | | |
| CN | 112397903 A | * | 2/2021 | | |
| TW | D209383 | | 1/2021 | | |

* cited by examiner

ANTENNA MODULE AND ELECTRONIC DEVICE

CROSS-REFERENCE TO RELATED APPLICATION

This application claims the priority benefit of Taiwan application serial no. 110142548, filed on Nov. 16, 2021. The entirety of the above-mentioned patent application is hereby incorporated by reference herein and made a part of this specification.

BACKGROUND

Technical Field

The disclosure relates to an antenna module and an electronic device, and more particularly, to a planar antenna module and an electronic device.

Description of Related Art

At present, some wearable smart thermometers on the market are attached to the human body through a patch similar to a band-aid. Since it is attached to the human skin, the efficiency of the antenna will be absorbed and interfered by the human body, and the loss will be too large, which affects the radiant energy of wireless transmission thereof. In addition, a coverage of the antenna of such a device is related to a sensing distance and an overall size.

SUMMARY

The disclosure provides an antenna module and an electronic device, which have a good antenna performance.

An antenna module in the disclosure includes a feeding end, multiple first forked radiators, and multiple connecting parts. The first forked radiators are disposed side by side. The connecting parts respectively extend from the feeding end to the first forked radiators. The feeding end, the first forked radiators, and the connecting parts are located on a same plane. The antenna module resonates at a frequency band, and a path length from the feeding end to an end of each of the first forked radiators through the corresponding connecting part is ¼ wavelength of the frequency band.

An electronic device in the disclosure includes a circuit board, a Bluetooth chip, and the antenna module. The Bluetooth chip is disposed on the circuit board. The antenna module is disposed on one side of the Bluetooth chip. The feeding end is connected to the Bluetooth chip.

In an embodiment of the disclosure, each of the first forked radiators is U-shaped and includes two parallel sections parallel to each other.

In an embodiment of the disclosure, each of the first forked radiators includes three parallel sections parallel to one another.

In an embodiment of the disclosure, each of the first forked radiators includes two parallel sections, and a distance between two adjacent ones of the first forked radiators is greater than or equal to a distance between the two parallel sections of each of the first forked radiators.

In an embodiment of the disclosure, the first forked radiators include the two first forked radiators. The distance between the two first forked radiators is between 6 mm and 10 mm, and the distance between the two parallel sections of each of the first forked radiators is between 2 mm and 4 mm.

In an embodiment of the disclosure, the first forked radiators include the three first forked radiators. The distance between two adjacent ones of the three first forked radiators is between 2 mm and 4 mm, and the distance between the two parallel sections of each of the first forked radiators is between 2 mm and 4 mm.

In an embodiment of the disclosure, spaces above and below the plane where the feeding end, the first forked radiators, and the connecting parts are located are circuit clearances.

In an embodiment of the disclosure, the antenna module further includes multiple second forked radiator. The first forked radiators include multiple parallel sections, and the second forked radiators are disposed side by side and are respectively connected to the parallel sections of the first forked radiators.

In an embodiment of the disclosure, each of the second forked radiators is U-shaped and includes two parallel sections parallel to each other.

In an embodiment of the disclosure, the electronic device further includes a casing and a temperature sensor. The circuit board, the Bluetooth chip, and the antenna module are located in the casing, and the temperature sensor is electrically connected to the circuit board and exposed to the casing.

Based on the above, the first forked radiators of the antenna module in the disclosure are disposed side by side. The connecting parts respectively extend from the feeding end to these first forked radiators. The feed ending, the first forked radiators, and the connecting parts are located on the same plane, and the path length from the feeding end to the end of each of the first forked radiators through the corresponding connecting part is ¼ wavelength of the frequency band. The antenna module in the disclosure, through the structure of the forked radiators on the same plane and side by side, may have the performance of the characteristics of the broadband antenna in the limited space, and may still maintain the certain performance when the human body is close to the antenna module.

DETAILED DESCRIPTION OF DISCLOSED EMBODIMENTS

Figure 1:
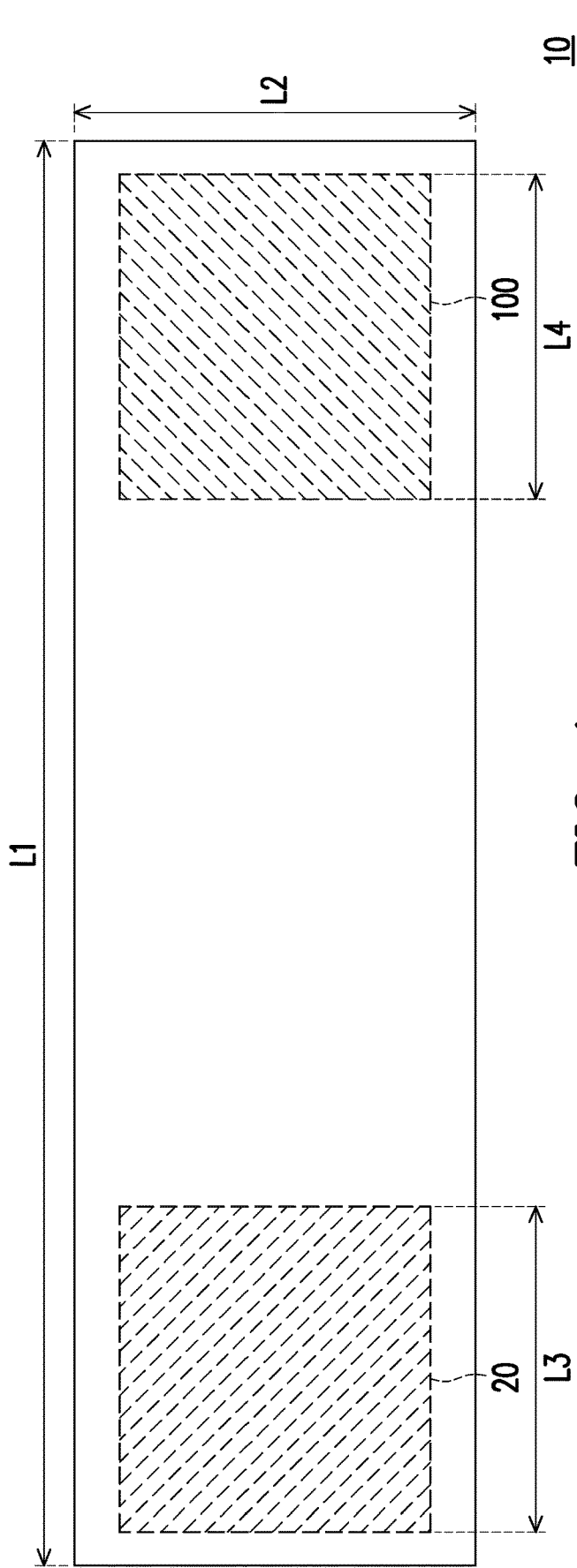
FIG. 1 is a schematic top view of an electronic device according to an embodiment of the disclosure.

FIG. 1 is a schematic top view of an electronic device according to an embodiment of the disclosure. Referring to FIG. 1, an electronic device 10 of this embodiment is, for example, a smart band-aid (a patch), which is a thermometer in a form of the band-aid (the patch), but a type of the electronic device 10 is not limited thereto. In this embodiment, a length L1 of the electronic device 10 is about 75 mm, and a width L2 is about 25 mm. Compared to smart patch products on the market, the electronic device 10 of this embodiment has a smaller size.

In addition, in this embodiment, the electronic device 10 includes an antenna module 100 and a near-field communication (NFC) antenna 20. A length L3 of the near-field communication antenna 20 and a length L4 of the antenna module 100 are both about 22 mm, while widths are also close to 22 mm, which have relatively small sizes.

Figure 2:
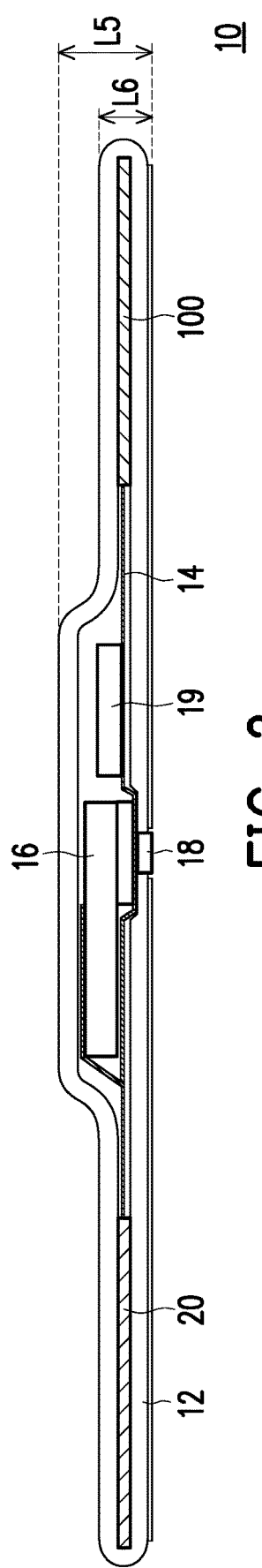
FIG. 2 is a schematic cross-sectional view of the electronic device of FIG. 1.

FIG. 2 is a schematic cross-sectional view of the electronic device of FIG. 1. Referring to FIGS. 1 and 2, the electronic device 10 further includes a casing 12, a circuit board 14, a battery 16, a temperature sensor 18, and a Bluetooth chip 19.

The circuit board 14 is, for example, the flexible circuit board 14. The battery 16 and the Bluetooth chip 19 are disposed on the circuit board 14 and are electrically connected to the circuit board 14. The antenna module 100 is, for example, a Bluetooth antenna, but a type of the antenna module 100 is not limited thereto. The antenna module 100 is disposed on one side (a right side) of the circuit board 14 and the Bluetooth chip 19. The antenna module 100 is connected to the Bluetooth chip 19.

In addition, in this embodiment, the near-field communication antenna 20 is disposed on another side (a left side) of the circuit board 14. That is to say, the antenna module 100 (the Bluetooth antenna) and the near-field communication antenna 20 are away from each other, and are symmetrically disposed on the two sides of the circuit board 14.

The casing 12 is, for example, silicone, which is flexible and skin-friendly, but a material of the casing 12 is not limited thereto. The circuit board 14, the Bluetooth chip 19, the antenna module 100, and the near-field communication antenna 20 are located in the casing 12. The temperature sensor 18 is electrically connected to the circuit board 14 and exposed to the casing 12.

In this embodiment, the electronic device 10 has a largest thickness L5 at a center, and the thickness L5 is about 4.6 mm. A thickness L6 of the electronic device 10 corresponding to the antenna module 100 is about 2.6 mm. The entire electronic device 10 has a small thickness.

It is worth mentioning that the antenna module 100 of this embodiment has a specific design, so as to have a performance of characteristics of a broadband antenna in a limited space, and may still maintain a certain performance when a human body is close to the antenna module 100, which will be described below.

Figure 3:
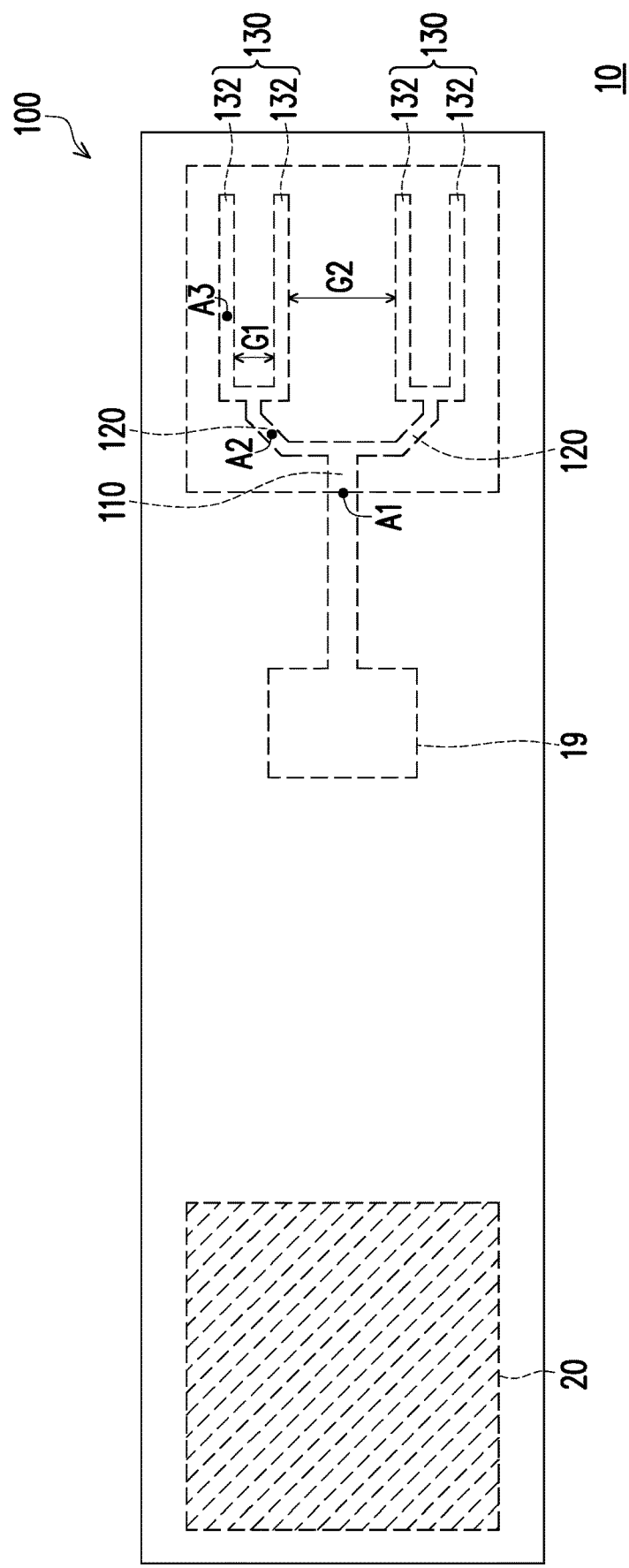
FIG. 3 is a schematic top view of an antenna module in the electronic device of FIG. 1.

FIG. 3 is a schematic top view of an antenna module in the electronic device of FIG. 1. It should be noted that FIG. 3 only shows the Bluetooth chip 19, the near-field communication antenna 20, and the antenna module 100, while other elements are hidden.

Referring to FIG. 3, in this embodiment, the antenna module 100 includes a feeding end 110 (a position A1), multiple connecting parts 120, and multiple first forked radiators 130. The feeding end 110 is connected to the Bluetooth chip 19.

The first forked radiators 130 are disposed side by side and extend in a direction away from the feeding end 110. In this embodiment, the number of the first forked radiators 130 is two, and each of the first forked radiators 130 is U-shaped and includes two parallel sections 132 parallel to each other. An opening of the first forked radiator 130 faces an edge (e.g., a right edge) of the electronic device 10. Of course, a form and configuration of the first forked radiator 130 are not limited thereto.

The connecting parts 120 respectively extend from the feeding end 110 to the first forked radiators 130. The number of the connecting parts 120 corresponds to the number of the first forked radiators 130. In this embodiment, the number of the connecting parts 120 is two. That is to say, the feeding end 110 is connected to the two first forked radiators 130 through the two connecting parts 120. Since each of the first forked radiator 130 has the two parallel sections 132, the feeding end 110 is connected to the four parallel sections 132 through the two connecting parts 120, so that the antenna module 100 forms four paths (along the positions A1, A2, and A3).

In this embodiment, structures of the feeding end 110, the connecting parts 120, and the side-by-side first forked radiators 130 present a dendritic distribution, which may achieve a maximum coverage and may improve frequency offsets or performance deterioration.

In addition, the antenna module 100 resonates at a frequency band, and a path from the feeding end 110 to an end of each of the first forked radiators 130 through the corresponding connecting part 120 is about ¼ wavelength of the frequency band. For example, if the frequency band is 2500 MHz, a length from the feeding end 110 to the parallel section 132 through the connecting part 120 may be ¼ wavelength of 2500 MHz, for example, 26 mm. Of course, the frequency band to which the antenna module 100 resonates at is not limited thereto. In an embodiment, the frequency band is, for example, between 2000 MHz and 6000 MHz.

In addition, a distance G2 between two adjacent ones of the first forked radiators 130 is greater than or equal to a distance G1 between the two parallel sections 132 of each of the first forked radiators 130. Specifically, in this embodiment, the distance G1 between the two parallel sections 132 of each of the first forked radiators 130 is between 2 mm and 4 mm, for example, 3 mm. The distance G2 between the two first forked radiators 130 is between 6 mm and 10 mm, for example, 8 mm. A design of the distance G2 greater than or equal to the distance G1 may reduce interference between the two adjacent paths.

In addition, in this embodiment, the feeding end 110, the first forked radiators 130, and the connecting parts 120 are located on the same plane. Therefore, the antenna module 100 is a planar antenna. According to FIG. 2, in this embodiment, spaces above and below the plane where the feeding end 110, the first forked radiators 130, and the connecting parts 120 are located are circuit clearances. That is to say, there is no ground layer or other circuit structures above and below the plane where the feeding end 110, the first forked radiators 130, and the connecting parts 120 are located. Such a design may avoid the interference. Therefore, the antenna module 100 of this embodiment may have the better performance.

Hereinafter, other forms of antenna modules will be described. It should be noted that in the following embodiments, the same or like reference numerals denote the same or like elements as those of the previous embodiment, and descriptions of the same technical contents are omitted. Only main differences are described.

Figure 4:
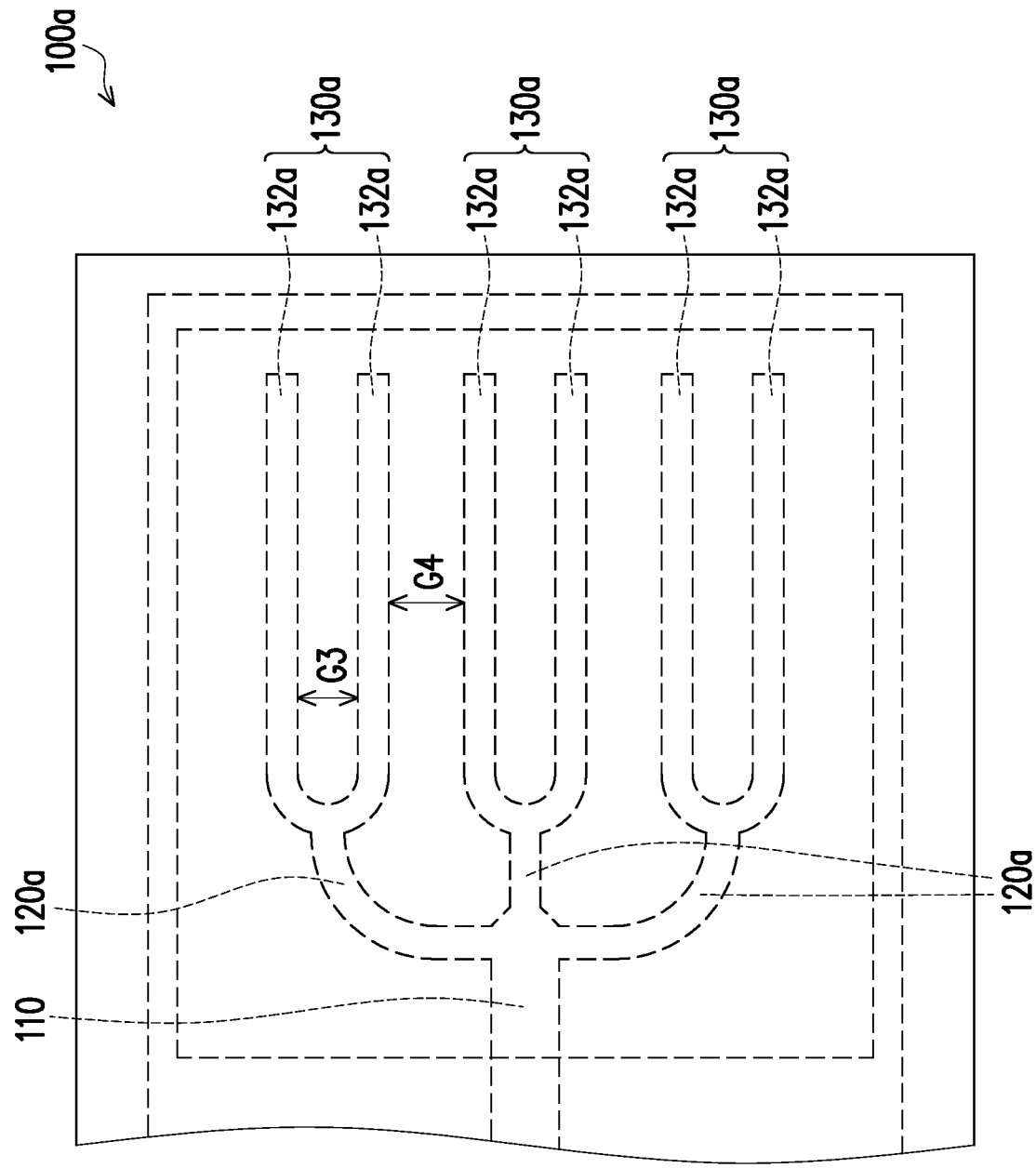
FIG. 4 is a schematic top view of an antenna module according to another embodiment of the disclosure.

FIG. 4 is a schematic top view of an antenna module according to another embodiment of the disclosure. Referring to FIG. 4, the main difference between an antenna module 100a of FIG. 4 and the antenna module 100 of FIG.

3 lies in the number of first forked radiators 130 and 130*a* and connecting parts 120 and 120*a*.

Specifically, in this embodiment, the number of the first forked radiators 130*a* is three, and the number of the connecting parts 120*a* is three. That is to say, the feeding end 110 is connected to the three first forked radiators 130*a* through the three connecting parts 120*a*. Since each of the first forked radiators 130*a* has two parallel sections 132*a* parallel to each other, the feeding end 110 is connected to the six parallel sections 132*a* through the three connecting parts 120*a*, so that the antenna module 100*a* forms six paths. In this embodiment, each of path lengths is ¼ wavelength of a frequency band of the antenna module 100*a*.

In addition, in this embodiment, a distance G3 between the two parallel sections 132*a* of each of the first forked radiators 130*a* is between 2 mm and 4 mm, for example, 2 mm. A distance G4 between two adjacent ones of the three first forked radiators 130*a* is between 2 mm and 4 mm, for example, 2.5 mm. The distances G3 and G4 within the above range may reduce the interference between the two adjacent paths.

In addition, another difference between the antenna module 100*a* of FIG. 4 and the antenna module 100 of FIG. 3 lies in shapes of the connecting parts 120 and 120*a*. In FIG. 3, the connecting part 120 has a turning point, and in FIG. 4, the connecting part 120*a* has an arc shape. A designer may adjust the shapes of the connecting parts 120 and 120*a* according to the space configuration and process requirements.

Figure 5:
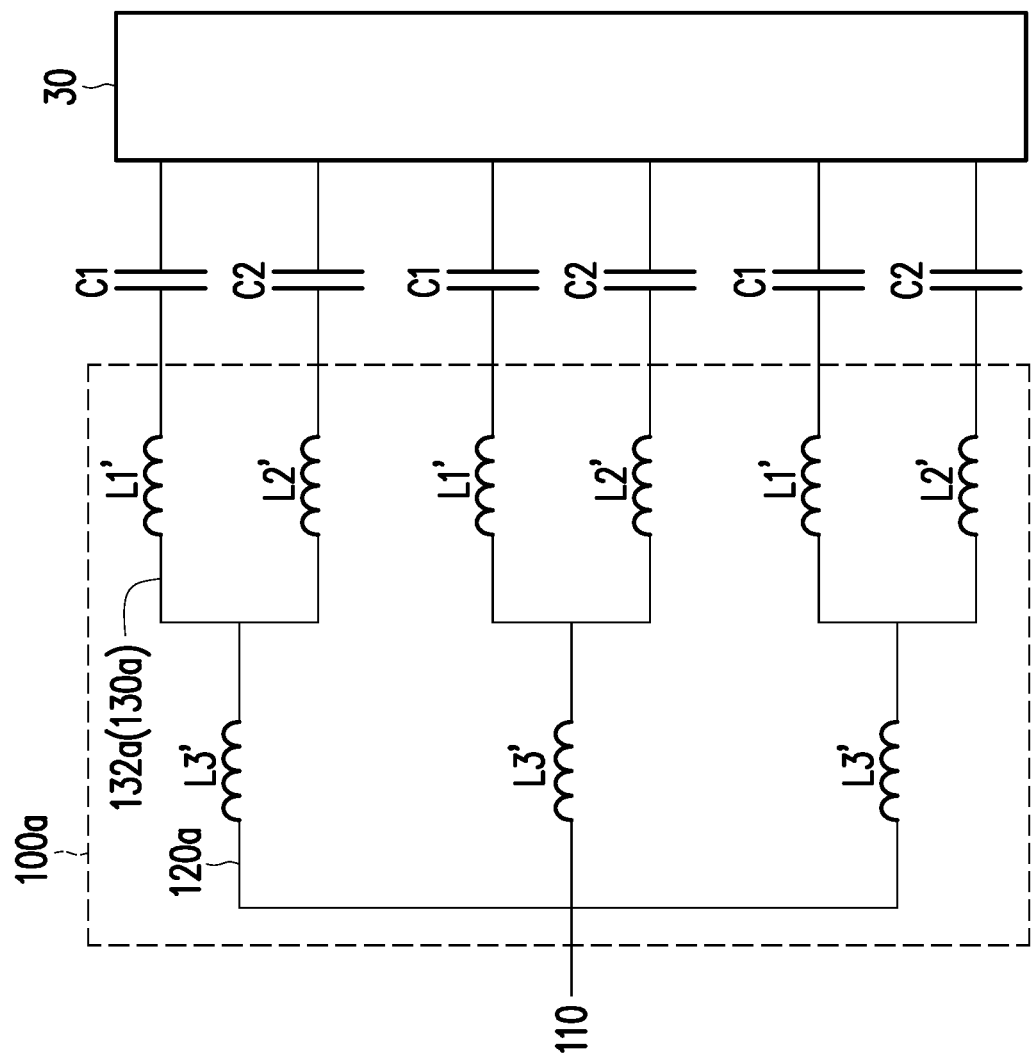
FIG. 5 is an equivalent circuit diagram of the antenna module of FIG. 4.

FIG. 5 is an equivalent circuit diagram of the antenna module of FIG. 4. It should be noted that FIG. 5 illustrates an equivalent circuit of the antenna module 100*a* of FIG. 4 when it is close to a human body 30. Referring to FIG. 5, in this embodiment, the two parallel sections 132*a* of the first forked radiator 130*a* are similar to two parallel inductances L1' and L2'. The connecting part 120*a* is similar to an inductance L3', and the inductance L3' is connected in series with the two parallel inductances L1' and L2'.

When the antenna module 100*a* is close to the human body 30, there are multiple capacitances C1 and C2 between the antenna module 100*a* and the human body 30 as a distance between the antenna module 100*a* and the human body 30 is different, so that a performance of the antenna module 100*a* is not easily affected by the human body 30. In addition, as the distance between the antenna module 100*a* and the human body 30 is different, the capacitances C1 and C2 between the antenna module 100*a* and the human body 30 have different response changes, which has an effect of improving the frequency offsets and performance.

Figure 6:
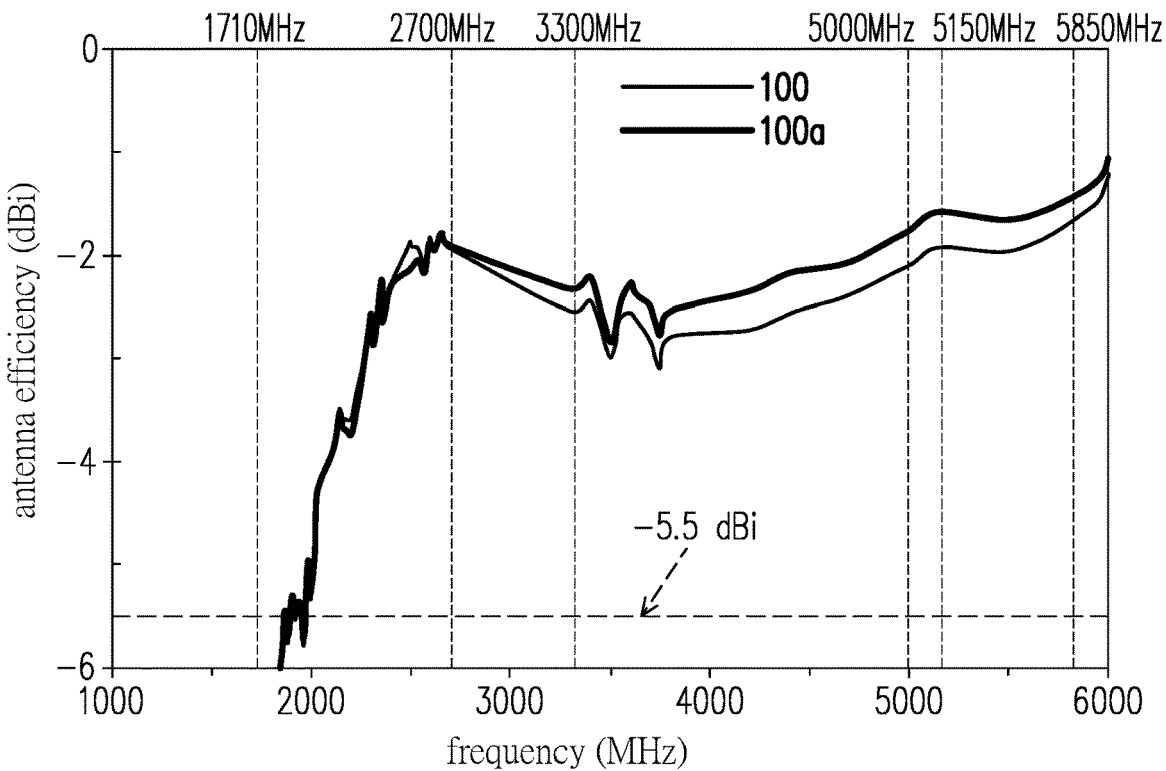
FIG. 6 is a schematic view of a frequency and antenna efficiency of the antenna modules of FIGS. 3 and 4.

FIG. 6 is a schematic view of a frequency and antenna efficiency of the antenna modules of FIGS. 3 and 4. Referring to FIG. 6, antenna efficiency of the antenna module 100 of FIG. 3 and the antenna module 100*a* of FIG. 4 is −1.1 dBi to −5.2 dBi at frequencies between 2000 MHz and 6000 MHz, which have the high performance and broadband performance.

In addition, after testing, compared to a conventional antenna without the forked radiator, the antenna efficiency of the antenna module 100 of FIG. 3 and the antenna module 100*a* of FIG. 4 may be increased by more than 15 dB. Therefore, the antenna module 100 of FIG. 3 and the antenna module 100*a* of FIG. 4 using the design of the side-by-side forked radiators may configure more patterns in the limited space, so as to reduce an absorption effect of the antenna attached to the human body 30 to have a better antenna performance.

Figure 7:
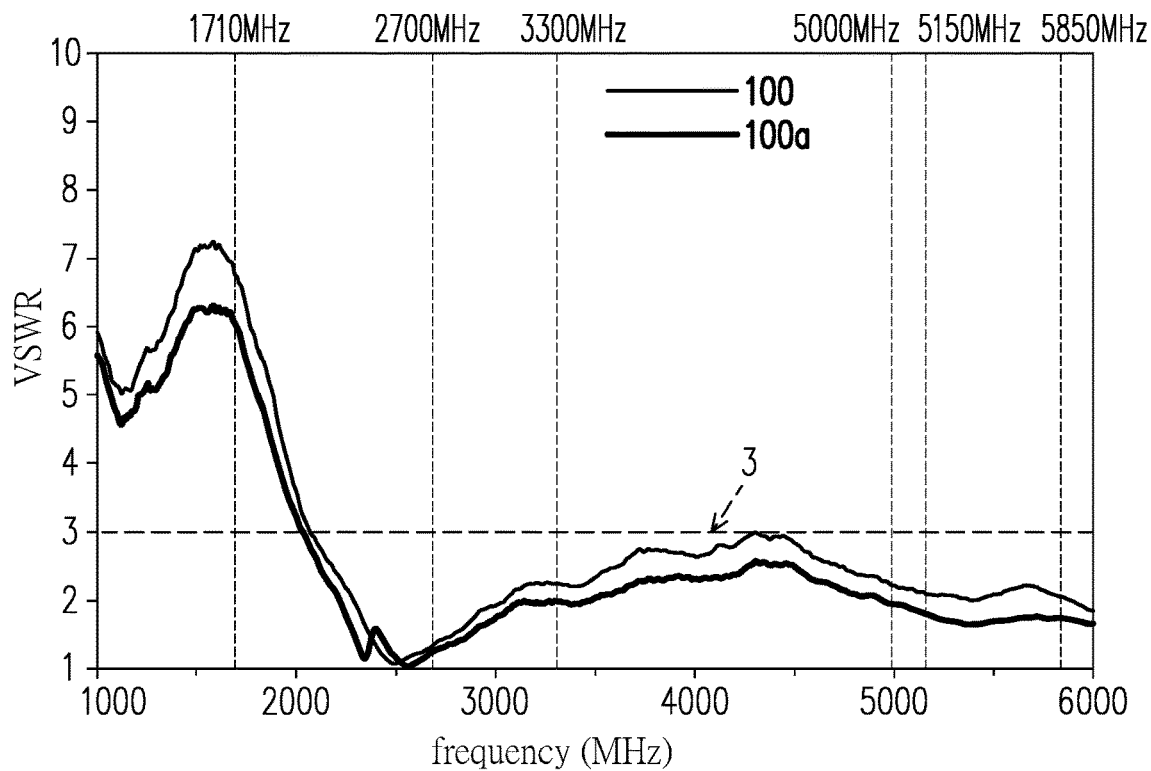
FIG. 7 is a schematic view of a frequency and VSWR of the antenna modules of FIGS. 3 and 4.

FIG. 7 is a schematic view of a frequency and VSWR of the antenna modules of FIGS. 3 and 4. Referring to FIG. 7, VSWRs of the antenna module 100 of FIG. 3 and the antenna module 100*a* of FIG. 4 are less than 3 at the frequencies between 2000 MHz and 6000 MHz, which has characteristics of good impedance matching.

Figure 8:
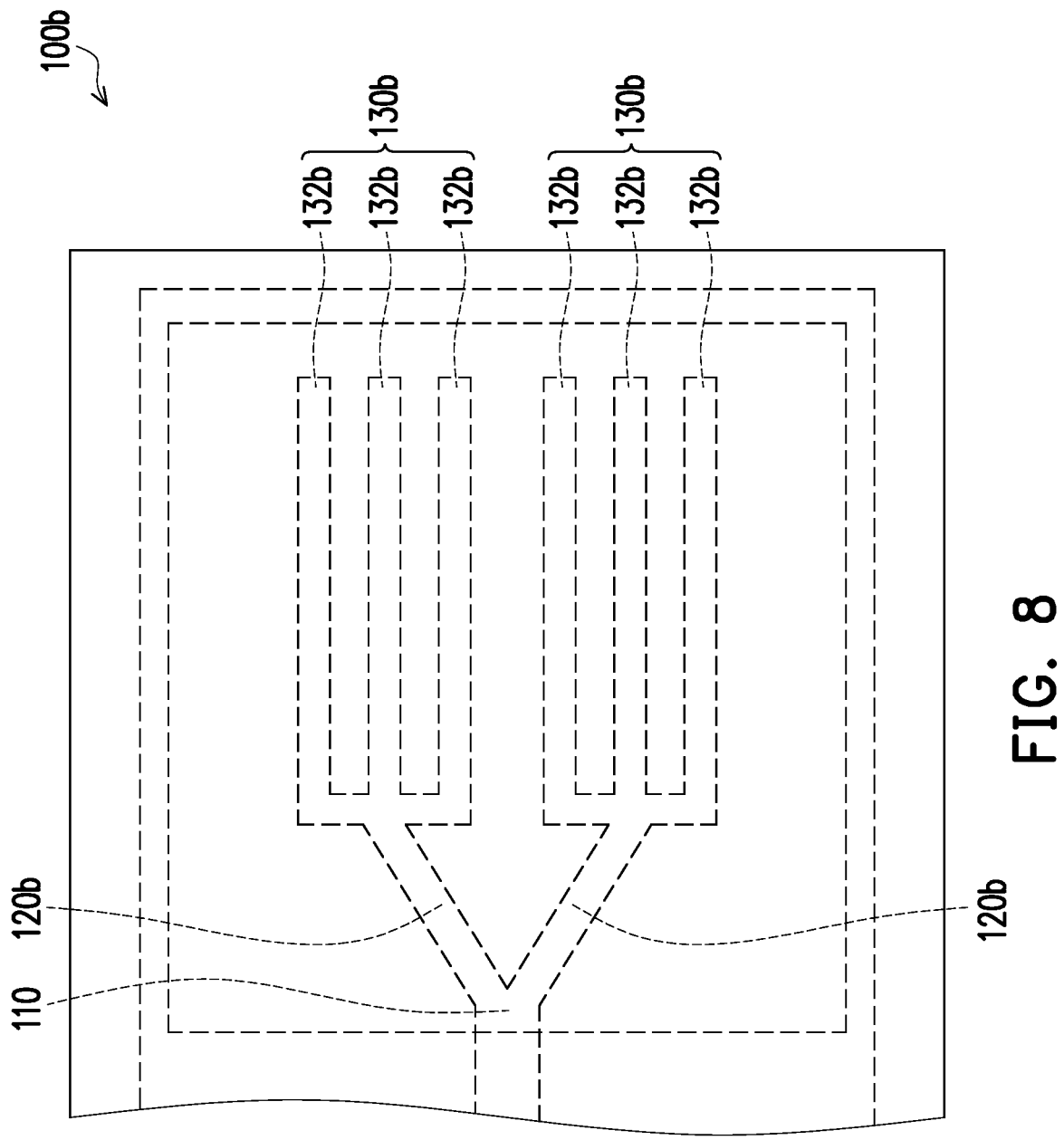
FIG. 8 is a schematic top view of an antenna module according to another embodiment of the disclosure.

FIG. 8 is a schematic top view of an antenna module according to another embodiment of the disclosure. Referring to FIG. 8, the main difference between an antenna module 100*b* of FIG. 8 and the antenna module 100 of FIG. 3 lies in shapes of first forked radiators 130 and 130*b*, that is, the number of parallel sections 132 and 132*b* in each of the first forked radiators 130 and 130*b*.

In this embodiment, each of the first forked radiators 130*b* of the antenna module 100*b* includes the three parallel sections 132*b* parallel to one another. Therefore, the feeding end 110 is connected to the six parallel sections 132*b* through two connecting parts 120*b*, so that the antenna module 100*b* forms six paths. Each of path lengths is ¼ wavelength of a frequency band of the antenna module 100*b*.

Of course, in other embodiments, the number of the parallel sections 132*b* in each of the first forked radiators 130*b* may also be four or more. In addition, in other embodiments, the different first forked radiators 130*b* may have different numbers of the parallel sections 132*b*, which is not limited by the drawings.

Figure 9:
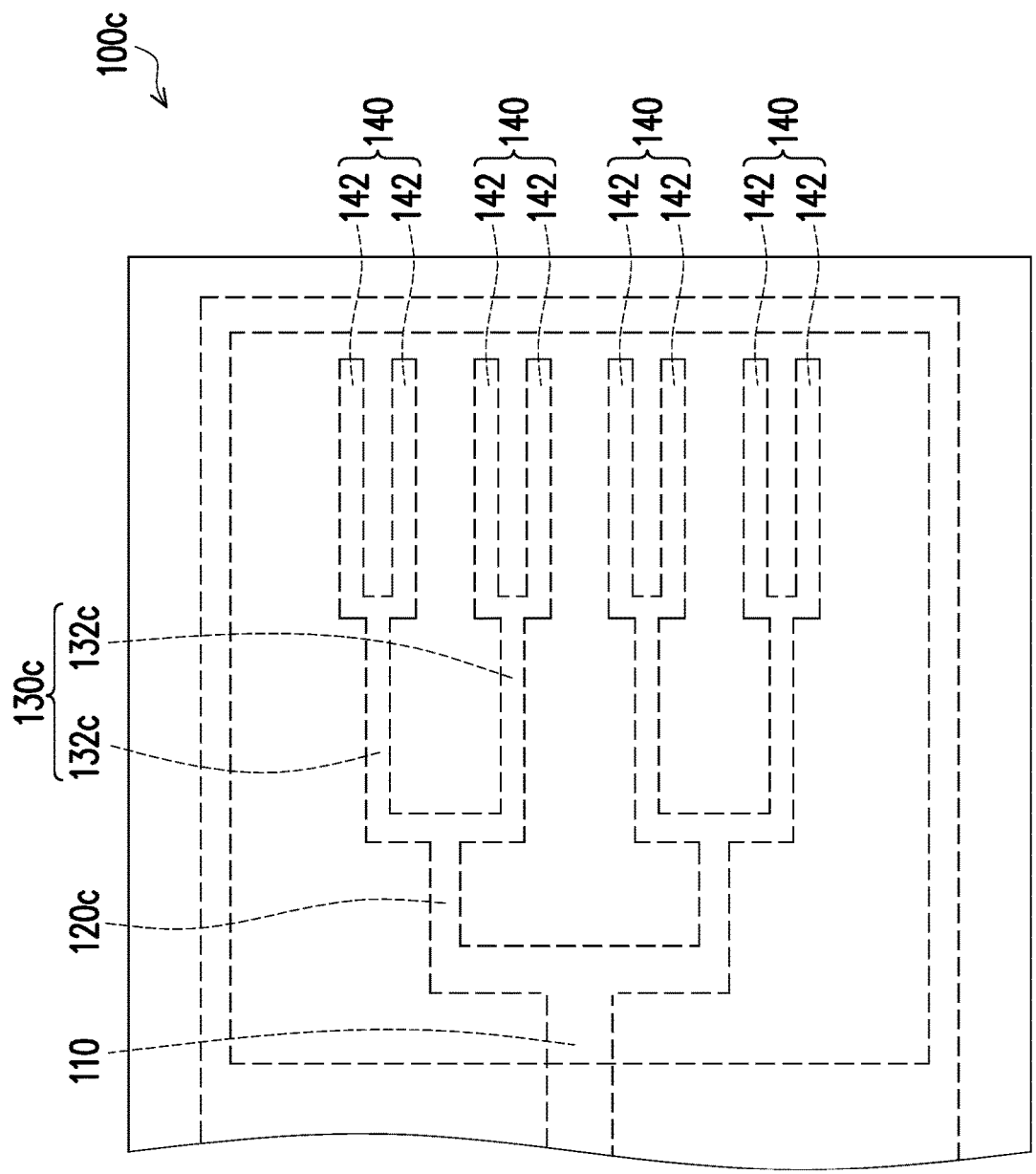
FIG. 9 is a schematic top view of an antenna module according to another embodiment of the disclosure.

FIG. 9 is a schematic top view of an antenna module according to another embodiment of the disclosure. Referring to FIG. 9, the main difference between an antenna module 100*c* of FIG. 9 and the antenna module 100 of FIG. 3 is that in this embodiment, the antenna module 100*c* further includes multiple second forked radiators 140. The second forked radiators 140 are disposed side by side, and are respectively connected to parallel sections 132*c* of first forked radiators 130*c*.

In this embodiment, each of the second forked radiators 140 is, for example, U-shaped, and has two parallel sections 142 parallel to each other. Therefore, the feeding end 110 is connected to the eight parallel sections 142 of the four second forked radiators 140 through two connecting parts 120*c* and the four parallel sections 132*c* of the two first forked radiators 130*c*, so that the antenna module 100*c* forms eight paths. In this embodiment, each of path lengths is ¼ wavelength of a frequency band of the antenna module 100*c*.

It should be noted that in other embodiments, the number of the parallel sections 132*c* of the first forked radiator 130*c* and the number of the parallel sections 142 of the second forked radiator 140 may also be more than two. In addition, the number of the parallel sections 132*c* of the first forked radiator 130*c* and the number of the parallel sections 142 of the second forked radiator 140 may also be different. The number of the parallel sections 132*c* of the first forked radiator 130*c* and the number of the parallel sections 142 of the second forked radiator 140 are not limited thereto.

Based on the above, the first forked radiators of the antenna module in the disclosure are disposed side by side. The connecting parts respectively extend from the feeding end to these first forked radiators. The feed ending, the first forked radiators, and the connecting parts are located on the same plane, and the path length from the feeding end to the end of each of the first forked radiators through the corresponding connecting part is ¼ wavelength of the frequency band. The antenna module in the disclosure, through the structure of the forked radiators on the same plane and side by side, may have the performance of the characteristics of the broadband antenna in the limited space, and may still maintain the certain performance when the human body is close to the antenna module.

What is claimed is:

1. An antenna module, comprising:
a feeding end;
a plurality of first forked radiators disposed side by side; and
a plurality of connecting parts respectively extending from the feeding end to the first forked radiators,
wherein the feeding end, the first forked radiators, and the connecting parts are located on a same plane, the antenna module resonates at a frequency band, and a path length from the feeding end to an end of each of the first forked radiators through the corresponding connecting part is ¼ wavelength of the frequency band,
wherein a width of each of the plurality of connecting parts is constant from the feeding end to the first forked radiators and is equal to a width of each of the plurality of the first forked radiators,
wherein spaces above and below the plane where the feeding end, the first forked radiators, and the connecting parts are located are circuit clearances, and two regions of the plane separated by the feeding end, the first forked radiators, and the connecting parts are circuit clearances.

2. The antenna module according to claim 1, wherein each of the first forked radiators is U-shaped and comprises two parallel sections parallel to each other.

3. The antenna module according to claim 1, wherein each of the first forked radiators comprises three parallel sections parallel to one another.

4. The antenna module according to claim 1, wherein each of the first forked radiators comprises two parallel sections, and a distance between two adjacent ones of the first forked radiators is greater than or equal to a distance between the two parallel sections of each of the first forked radiators.

5. The antenna module according to claim 4, wherein the first forked radiators comprise the two first forked radiators, the distance between the two first forked radiators is between 6 mm and 10 mm, and the distance between the two parallel sections of each of the first forked radiators is between 2 mm and 4 mm.

6. The antenna module according to claim 4, wherein the first forked radiators comprise the three first forked radiators, the distance between two adjacent ones of the three first forked radiators is between 2 mm and 4 mm, and the distance between the two parallel sections of each of the first forked radiators is between 2 mm and 4 mm, when the distance between two adjacent ones of the three first forked radiators is equal to 2 mm, the distance between the two parallel sections of each of the first forked radiators is equal to 2 mm, and when the distance between the two parallel sections of each of the first forked radiators is equal to 4 mm, the distance between two adjacent ones of the three first forked radiators is equal to 4 mm.

7. The antenna module according to claim 1, further comprising a plurality of second forked radiators, wherein the first forked radiators comprise a plurality of parallel sections, and the second forked radiators are disposed side by side and are respectively connected to the parallel sections of the first forked radiators.

8. The antenna module according to claim 7, wherein each of the second forked radiators is U-shaped and comprises two parallel sections parallel to each other.

9. An electronic device, comprising:
a circuit board;
a Bluetooth chip disposed on the circuit board; and
an antenna module, comprising:
a feeding end;
a plurality of first forked radiators disposed side by side; and
a plurality of connecting parts respectively extending from the feeding end to the first forked radiators,
wherein the feeding end, the first forked radiators, and the connecting parts are located on a same plane, the antenna module resonates at a frequency band, and a path length from the feeding end to an end of each of the first forked radiators through the corresponding connecting part is ¼ wavelength of the frequency band,
wherein a width of each of the plurality of connecting parts is constant from the feeding end to the first forked radiators and is equal to a width of each of the plurality of the first forked radiators,
wherein spaces above and below the plane where the feeding end, the first forked radiators, and the connecting parts are located are circuit clearances, and two regions of the plane separated by the feeding end, the first forked radiators, and the connecting parts are circuit clearances.

10. The electronic device according to claim 9, wherein each of the first forked radiators is U-shaped and comprises two parallel sections parallel to each other.

11. The electronic device according to claim 9, wherein each of the first forked radiators comprises three parallel sections parallel to one another.

12. The electronic device according to claim 9, wherein each of the first forked radiators comprises two parallel sections, and a distance between two adjacent ones of the first forked radiators is greater than or equal to a distance between the two parallel sections of each of the first forked radiators.

13. The electronic device according to claim 12, wherein the first forked radiators comprise the two first forked radiators, the distance between the two first forked radiators is between 6 mm and 10 mm, and the distance between the two parallel sections of each of the first forked radiators is between 2 mm and 4 mm.

14. The electronic device according to claim 12, wherein the first forked radiators comprise the three first forked radiators, the distance between two adjacent ones of the three first forked radiators is between 2 mm and 4 mm, and the distance between the two parallel sections of each of the first forked radiators is between 2 mm and 4 mm, when the distance between two adjacent ones of the three first forked radiators is equal to 2 mm, the distance between the two parallel sections of each of the first forked radiators is equal to 2 mm, and when the distance between the two parallel sections of each of the first forked radiators is equal to 4 mm, the distance between two adjacent ones of the three first forked radiators is equal to 4 mm.

15. The electronic device according to claim 9, further comprising a plurality of second forked radiators, wherein the first forked radiators comprise a plurality of parallel sections, and the second forked radiators are disposed side by side and are respectively connected to the parallel sections of the first forked radiators.

16. The electronic device according to claim 15, wherein each of the second forked radiators is U-shaped and comprises two parallel sections parallel to each other.

17. The electronic device according to claim 9, further comprising a casing and a temperature sensor, wherein the circuit board, the Bluetooth chip, and the antenna module are located in the casing, and the temperature sensor is electrically connected to the circuit board and exposed to the casing.

* * * * *